Feb. 3, 1925. Re. 15,991

T. LUNDBERG

SWITCH POINT LEAD

Original Filed Nov. 22, 1922

Inventor:
Thomas Lundberg
by Wright Brown Quinby & May
Attys.

Reissued Feb. 3, 1925. Re. 15,991

UNITED STATES PATENT OFFICE.

THOMAS LUNDBERG, OF EVERETT, MASSACHUSETTS, ASSIGNOR OF ONE-HALF TO ANSEL CADY, OF BROOKLINE, MASSACHUSETTS.

SWITCH-POINT LEAD.

Original No. 1,516,863, dated November 25, 1924, Serial No. 602,594, filed November 22, 1922. Application for reissue filed December 8, 1924. Serial No. 754,689.

*To all whom it may concern:*

Be it known that I, THOMAS LUNDBERG, a citizen of the United States, residing at Everett, in the county of Middlesex and State of Massachusetts, have invented new and useful Improvements in Switch-Point Leads, of which the following is a specification.

This invention relates to switch point or contact leads and while not restricted to such use has been more particularly designed to facilitate the assembly of radio instruments and to improve their construction.

As ordinarily constructed the contacts for the variable inductances are arranged in circular series in a panel, a contact arm pivoted concentrically with relation to the series on the front face of the panel being arranged to sweep over the ends of the contacts to make the desired connections. These contacts extend through the panel and the lead wires from the inductances are made fast thereto back of the panel commonly by soldering. These contacts are so close together, however, that it is a difficult matter to make effective solder joints. In most cases there is insufficient room for screw binding posts at the rear ends of the contacts and such binding posts are at best somewhat insecure and the leads are liable to become turned from their proper position causing danger of short circuits between them.

To overcome these difficulties the present invention provides contacts each formed in two easily and securely engageable parts acting to clamp the panel therebetween, one of these parts being designed to have attached thereto the end of the lead wire. Since the connections to the lead wire may thus be effected before the contacts are in position on the panel, such connections may be readily effected in a secure manner. In order to render the connections rigid and durable the rear contact part may have a hole therein preferably axially thereof to receive the end of the lead wire which may be soldered or secured mechanically or in any other suitable way permanently therein. By entering the wires axially of the contacts any tendency for them to become twisted or turned relative thereto so as to cause liability of the various leads contacting and causing short circuits is effectually avoided.

For a more complete understanding of this invention, reference may be had to the accompanying drawings in which—

Figure 7:
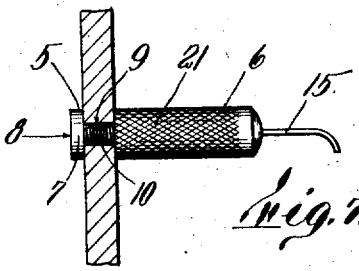
Figure 7 is a detail section on line 7—7 of Figure 6.
Figure 6:
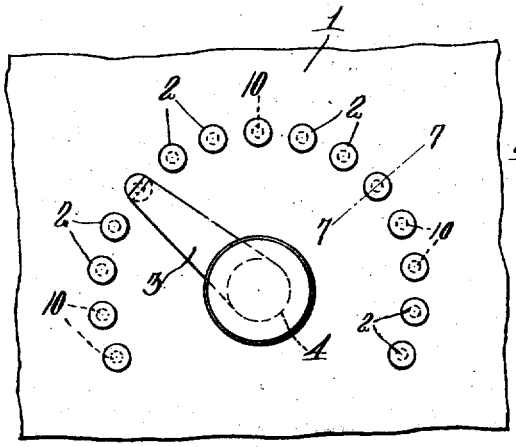
Figure 6 is a fragmentary front elevation of a panel showing the contacts and arm in position thereon.

Referring first to Figures 6 and 7, at 1 is indicated a panel having a series of contacts 2 projecting from the forward face thereof in circular series to be contacted by an arm 3 pivoted at 4 concentric with the series and which may sweep over the contacts serially. The rear faces of these contacts are designed to be connected to the lead wires from the variable inductance and as shown are so small and close together that it is a difficult matter to make soldered connections between the lead wires and the contacts while the contacts are in position. In order to overcome the necessity of making the connections at this time, each contact 2 is formed of a pair of integral members 5 and 6. The forward member 5, as shown, is provided with a head 7 having its forward face 8 designed to be contacted by the swinging arm 3, and extending rearwardly from the head 7 through a perforation 9 in the panel 1 is a threaded shank portion 10, the perforation 9 being smaller than the head 7 so that the head may rest flat against the forward face of the panel.

Figure 1:
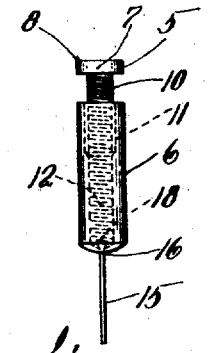
Figure 1 is an elevation of a contact and lead wire asembled.
Figure 2:
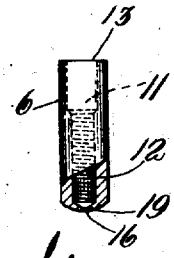
Figure 2 is an elevation partly in section of one form of rear contact part ready to receive the lead wire.
Figure 3:
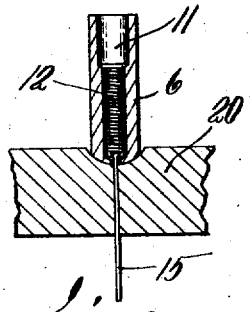
Figure 3 is a sectional detail showing a manner of mechanically attaching the lead wire to the contact part.
Figure 4:
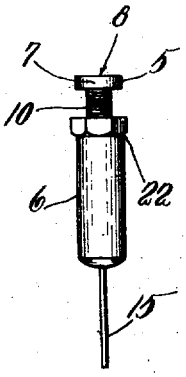
Figure 4 is a side elevation showing a modified form of contact.
Figure 5:
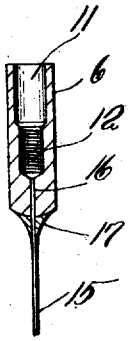
Figure 5 is a cross section through the rear contact part showing another method of attaching the lead wire.

The rear or lead member 6, as shown more particularly in Figures 1 to 3 and 5, is provided in its forward end portion with a socket 11 threaded as at 12 to mate the threads of the shank 10, the forward end 13 of this member resting against the rear face of the panel 1 so that the panel may be clamped between the head 8 and the rear member 6 by screwing the two members together. To the rear member 6 is fixed the lead wire 15 and for this purpose the rear end of the member 6 is preferably formed with an axial perforation 16 in alinement with, and if desired, opening into the socket within which the end of the lead wire 15 may be inserted and made fast. One method of making this lead wire fast is by soldering, as shown at 17 in Figure 5. The wire may be also fixed mechanically as shown in Figures 1 to 3, the wire being headed within the end portion of the socket 11 as shown at 18 and if desired also the portions of this member at either side of the perforation 16 may be made comparatively thin as shown at 19 in Figure 2 so that they may be turned inwardly against the lead wire by means of a die 20 into which the end of the socket member may be forced. The socket and lead wires are united into a substantially integral structure which is attachable to and removable from the contact member as a unit. In order to effect a ready engagement of the contact members one or both may be knurled on its outer face as shown at 21 in Figure 7 so that they may be readily grasped by the fingers or by a suitable tool, or if desired a portion of one or both of the members may be polygonal in cross section as shown at 22 in Figure 4. Generally it is advisable to knurl or otherwise form for engagement with the fingers or toll the rear member only, the forward member then presenting a smooth round head to the contact arm and effecting a neater appearance for the forward face of the panel.

By inserting the leads in the end of the rear contact member they extend directly outward therefrom, as shown more particularly in Figure 7 and may then be bent as required to lead to the various points of the variable inductance. By causing the lead wires to first extend directly away from the contacts substantially perpendicular to the panel it is an easy matter to keep them free from contact with each other so that danger of short circuits from this cause is avoided and when in place they hold the rear member against turning so that the contact may be tightened or loosened as required by merely turning the forward member.

Having thus described certain embodiments of this invention it should be evident to those skilled in the art that many changes or modifications might be made therein without departing from its spirit or scope as defined by the appended claims.

I claim:

1. In radio and similar apparatus, in combination, a panel having a perforation therethrough, an integral contact member having a threaded shank portion extending through said perforation and a head engageable with the adjacent face of said panel, and a contact lead comprising a member having a threaded socket in one end for engagement with the threads of said shank extending through the panel and between which and said head said panel may be clamped and having a perforation extending through its opposite end in axial alinement with said socket, and a lead wire extending into said perforation and permanently fixed therein, whereby said lead wire and socket member are attachable to and detachable from said contact member as a unit.

2. In radio and similar apparatus, in combination, an integral contact member having a threaded shank portion and a head, and a contact lead comprising a member having a threaded socket in one end for engagement with the threads of said shank and having a perforation extending through its opposite end in axial alinement with said socket, and a lead wire extending into said perforation and permanently fixed therein whereby said lead wire and socket member are attachable to and detachable from said contact member as a unit.

3. A lead wire attaching member for a radio contact element and the like, which comprises an integral member having an internally threaded socket extending inwardly from one end adapted to receive the threaded shank of a contact piece, said member being perforated through its opposite end in axial alinement with said socket, and a lead wire having one end seated in said perforation and permanently fixed therein, said lead wire and socket member thus forming substantially an integral structure.

In testimony whereof I have affixed my signature.

THOMAS LUNDBERG.